United States Patent
Adams et al.

(10) Patent No.: US 8,949,988 B2
(45) Date of Patent: Feb. 3, 2015

(54) METHODS FOR PROACTIVELY SECURING A WEB APPLICATION AND APPARATUSES THEREOF

(75) Inventors: Kyle Adams, West Henrietta, NY (US); Victor Pinenkov, Penfield, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 429 days.

(21) Appl. No.: 13/035,723

(22) Filed: Feb. 25, 2011

(65) Prior Publication Data

US 2011/0214182 A1 Sep. 1, 2011

Related U.S. Application Data

(60) Provisional application No. 61/339,062, filed on Feb. 26, 2010.

(51) Int. Cl.

| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/00* | (2013.01) |
| *H04L 29/06* | (2006.01) |
| *G06F 21/57* | (2013.01) |

(52) U.S. Cl.
CPC ............ *G06F 21/00* (2013.01); *H04L 63/1408* (2013.01); *H04L 63/1416* (2013.01); *G06F 21/577* (2013.01); *H04L 63/145* (2013.01); *H04L 63/1433* (2013.01)
USPC ............................................... 726/23; 726/25

(58) Field of Classification Search
CPC .............. H04L 63/1416; H04L 63/145; H04L 63/1408; H04L 63/1433; G06F 21/577
See application file for complete search history.

(56) References Cited

U.S. PATENT DOCUMENTS

| 7,089,589 | B2 * | 8/2006 | Chefalas et al. ................. 726/22 |
| 7,360,250 | B2 * | 4/2008 | Miyagawa et al. .............. 726/23 |
| 7,464,407 | B2 * | 12/2008 | Nakae et al. ..................... 726/22 |
| 7,636,943 | B2 * | 12/2009 | Gruper et al. .................... 726/22 |
| 7,958,549 | B2 * | 6/2011 | Nakae et al. ..................... 726/11 |
| 8,181,249 | B2 * | 5/2012 | Chow et al. ...................... 726/23 |
| 2001/0044785 | A1 * | 11/2001 | Stolfo et al. ..................... 705/74 |
| 2009/0222920 | A1 * | 9/2009 | Chow et al. ...................... 726/23 |
| 2009/0241191 | A1 * | 9/2009 | Keromytis et al. .............. 726/23 |
| 2010/0071051 | A1 * | 3/2010 | Choyi et al. ..................... 726/12 |
| 2010/0077483 | A1 * | 3/2010 | Stolfo et al. ..................... 726/24 |

* cited by examiner

*Primary Examiner* — Azizul Choudhury
(74) *Attorney, Agent, or Firm* — Shumaker & Sieffert, P.A.

(57) ABSTRACT

A method, non-transitory computer readable medium, and apparatus that proactively secures a web application includes injecting one or more decoys into an executing web application. An attempt to exploit one of the one more injected decoys in the executing application is identified. At least one action to secure the executing application from the attempted exploitation is performed.

21 Claims, 6 Drawing Sheets

```
<form action="/search/node" method="post" id="search-block-form">
    <div>
        <div class="container-inline">
            <div class="form-item">
                <input type="text" maxlength="128" name="search_block_form_keys" id="edit-search-block-form-keys" size="15" value="" title="Enter the terms you wish to search for." class="form-text" />
            </div>
            <input type="submit" name="op" id="edit-submit" value="Search" class="form-submit" />
            <input type="hidden" name="form_id" id="edit-search-block-form" value="search_block_form" />
        </div>
    </div>
</form>
```
⎬ 300A

```
<form action="/search/node" method="post" id="search-block-form">
    <div>
        <div class="container-inline">
            <div class="form-item">
                <input type="text" maxlength="128" name="search_block_form_keys" id="edit-search-block-form-keys" size="15" value="" title="Enter the terms you wish to search for." class="form-text" />
            </div>
            <input type="submit" name="op" id="edit-submit" value="Search" class="form-submit" />
            <input type="hidden" name="ignore" value="false" />
            302A        302B             302C
            <input type="hidden" name="form_id" id="edit-search-block-form" value="search_block_form" />
        </div>
    </div>
</form>
```
⎬ 300B

```
                       response_examples.txt
/*
        EXAMPLE ONE:    Warn an attacker after they access .htpasswd. .htpasswd is a decoy.
                Block them if they do it again after closing the warning.
*/
// Get the list of htpasswd incidents
var incidents = profile.getIncidents("4002");

// Count how many times the user hit htpasswd
var count = 0;
for (var x = 0; x <incidents.size(); x++) {
        count+=incidents.get(x).getCount();
}

// Make sure they hit it at least once
if (count > 0) {
        logger.debug("Found htpasswd request (" + count + ")!!");

// Make sure the user is not currently being warned or blocked
        if (profile.hasActiveResponse("WR") != true && profile.hasActiveResponse("BL") !=
true) { logger.debug("No warn or Block!!!");

// See if we have previously warned the user
                if (profile.hasResponse("WR") == true) {

// we have already warned the user, so search for configured used on
the last warning we issued
                        var responses = profile.getResponses();
                        var lastConfig = "";
                        for (var x =responses.size() - 1; x>=0; x--) {
                                if (responses.get(x).getResponseCode().equals("WR")) {
                                        lastConfig = responses.get(x).getConfig();
```

FIG. 5A

```
            // See if the configuration indicates that the warning was for a
different count then we have now (they hit htpasswd again after the warning!)
            if (lastConfig != "<config count=\"" + count + "\"/>") {
                logger.debug("Acivating Block!!!");
                // Block the user for hitting htpasswd again after being
warned.
                responseAPI.activateResponse("BL", "<config />");
            }
        }
        else {
            // The user has not been warned yet, so warn them now (include the
number of times they hit htpasswd in the warning config for future reference)
            logger.debug("Acivating Warn!!!");
            responseAPI.activateResponse("WR", "<config count=\"" + count +
"\"/>");
        }
    }
/*
*/
        EXAMPLE TWO: Block any attacker that accesses .htpasswd file.
// Block any user that is not already blocked and has accessed .htpasswd at least once
var incidents = profile.getIncidents("4002");
if (incidents.size() > 0 && profile.hasActiveResponse("BL")) {
    responseAPI.activateResponse("BL", "<config />");
}
```

*FIG. 5B*

METHODS FOR PROACTIVELY SECURING A WEB APPLICATION AND APPARATUSES THEREOF

This application claims the benefit of U.S. Provisional Patent Application Ser. No. 61/339,062 filed Feb. 26, 2010, which is hereby incorporated by reference in its entirety.

FIELD

This technology generally relates to securing applications and, more particularly, to methods for proactively securing applications and apparatuses thereof.

BACKGROUND

In computer network environments, application vulnerabilities (e.g., those of web applications) pose an extremely serious threat to user privacy, data security, and financial safety. Conventionally, a common practice for protecting applications includes deployment of firewalls such as web application firewalls (WAFs) and/or network intrusion detection systems (IDSs).

Unfortunately, a limitation of such systems is the reactive approach taken by these systems in detecting malicious activity. These conventional techniques can only detect the attacks they are configured to protect against and only while the attacks are in progress. Additionally, they have limited or in some cases no visibility into attackers inspecting, analyzing and reverse engineering the site, whether an attacker has already been successful in compromising the web application, the attacker's skill level, whether the attacker has attempted an attack before, the level of threat the attacker poses, or other data related to profiling the attacker.

SUMMARY

A method for proactively securing a web application includes injecting with a proactive administrative proxy server one or more decoys into an executing web application. An attempt to exploit one of the one more injected decoys in the executing application is identified with the proactive administrative proxy server. At least one action to secure the executing application from the attempted exploitation is performed with the proactive administrative proxy server.

A non-transitory computer readable medium having stored thereon instructions for proactively securing a web application comprising machine executable code which when executed by at least one processor, causes the processor to perform steps including injecting one or more decoys into an executing web application. An attempt to exploit one of the one more injected decoys in the executing application is identified. At least one action to secure the executing application from the attempted exploitation is performed.

A proactively secured computing apparatus includes one or more processors and a memory coupled to the one or more processors which are configured to execute programmed instructions stored in the memory including injecting one or more decoys into an executing web application. An attempt to exploit one of the one more injected decoys in the executing application is identified. At least one action to secure the executing application from the attempted exploitation is performed.

This technology provides a number of exemplary advantages. For example, embodiments of this technology protect existing web applications by providing a counter-intrusion technique in real-time making it harder for hackers or malicious code to inspect, analyze and reverse engineer and discover real vulnerabilities that could comprise the web application. Using this technology, application administrators can identify track and respond to hackers as they attempt to establish an attack vector. Upon detection of a hacker, this technology understands their behavior by tracking their actions, evaluating skill levels, and classifying the threat they pose. Once the skills of the hacker or malicious attacker are classified, security administrators, for example, can decide on an appropriate response or counter-measures to deploy in real-time. Counter-measures can also be defined and executed based on policy. Further, data related to the attacker can be stored in one or more databases which security administrators can analyze over time allowing better anticipation of future attacks and prioritization of responses against future attack scenarios.

DETAILED DESCRIPTION

Figure 1:
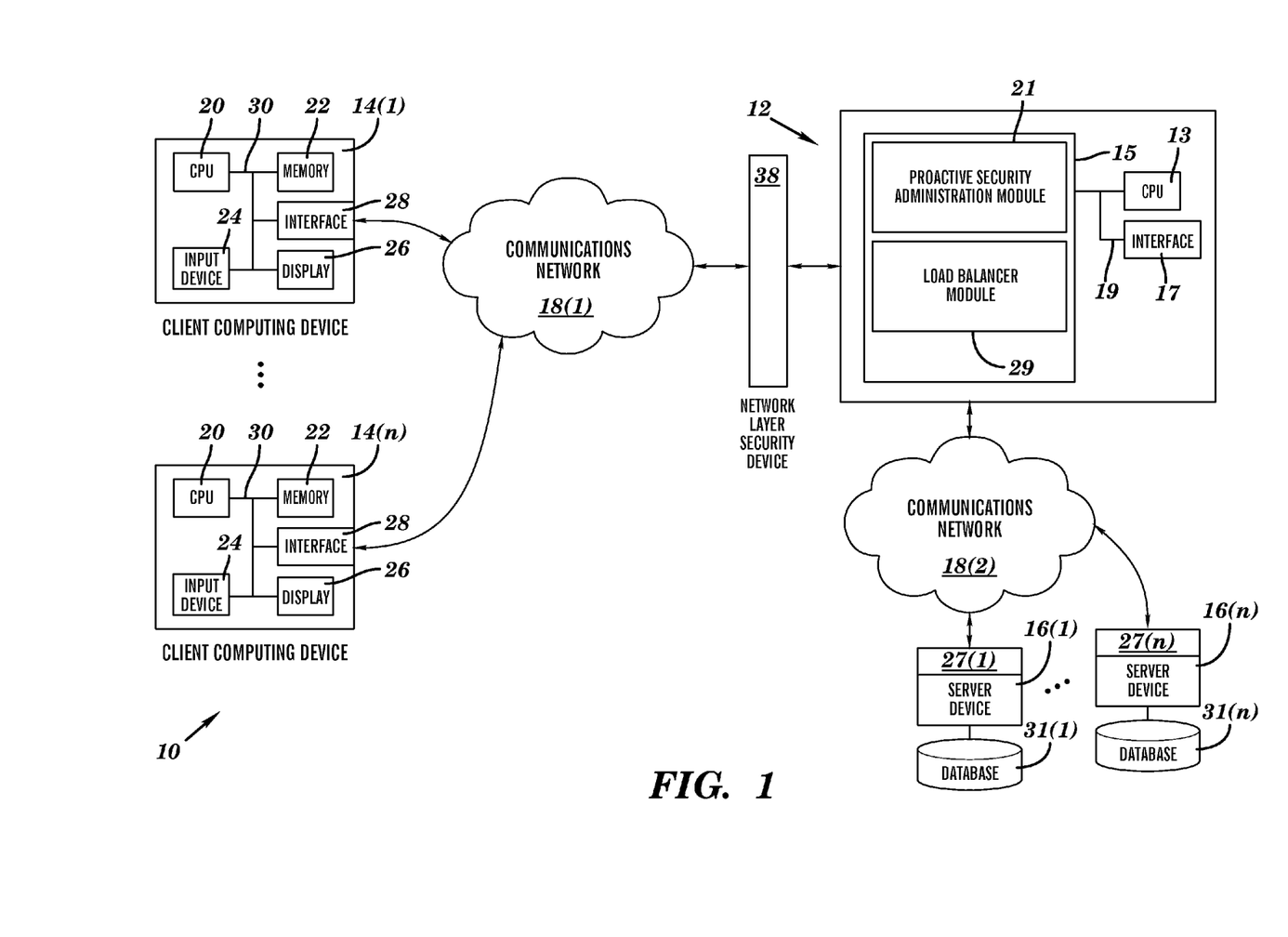
FIG. 1 illustrates an exemplary network scenario for proactively securing applications.

Referring to FIG. 1, an exemplary network environment 10 includes a proactive security administration module 21 included inside an exemplary proxy server device 12. By way of example only, proxy server device 12 can be a web content proxy server, or other types of proxy servers well known to those of ordinary skill in the art. The exemplary environment 10 includes client devices 14(1)-14(n), a network layer security device 38 (e.g., a firewall or an intrusion detection system), server devices 16(1)-16(n) with respective databases 31(1)-31(n), and communication networks 18(1)-18(2), although other numbers and types of systems, devices, and/or elements in other configurations and environments with other communication network topologies can be used. This technology provides a number of advantages including providing a method, non-transitory computer readable medium, and an apparatus that proactively secures applications, e.g., web pages with applications. It is to be noted that in the exemplary network environment 10, the index "n" is used to denote any real integer number of devices starting with n=1.

In the exemplary network environment 10, the proxy server device 12 is interposed between client devices 14(1)-14(n) and the server devices 16(1)-16(n) for providing proactive security administration functionality, although the proxy server device 12 can provide other numbers and types of functions. In an alternative embodiment, proxy server device 12 may be integrated with one or more server devices 16(1)-16(n) for proactively securing respective applications 27(1)-27(n), according to various example embodiments of this technology. Although one proxy server device 12 is shown, other numbers and types of web content proxy devices and systems can be used. By way of example only, according to one embodiment of this technology, proxy server device 12 can be a security appliance device (e.g., Mykonos Security Appliance provided Mykonos Software, Inc. of Burlingame, Calif.) communicating with one or more application servers, e.g., server devices 16(1)-16(n), for proactively securing applications executing for client devices 14(1)-14(n). Further, by way of example only, the proxy server device 12 can be an HTTP or HTTPS in-line proxy server, a bridge proxy server, a caching proxy server, combinations thereof, or other types of servers known to one of ordinary skill in the art.

The proxy server device 12 includes a central processing unit (CPU) or processor 13, a memory 15 including a proactive security administration module 21 and an application level load balancing module 29, the and an interface system 17 which are coupled together by a bus 19 or other link, although other numbers and types of components, parts, devices, systems, and elements in other configurations and locations can be used. The processor 13 in the proxy server device 12 executes a program of stored instructions one or more aspects of this technology as described and illustrated by way of the embodiments herein, although the processor 13 could execute other numbers and types of programmed instructions.

The memory 15 in the proxy server device 12 stores these programmed instructions for one or more aspects of this technology as described and illustrated herein including the identified modules 21 and 29, although some or all of the programmed instructions could be stored and/or executed elsewhere. A variety of different types of memory storage devices, such as a random access memory (RAM) or a read only memory (ROM) or a floppy disk, hard disk, CD ROM, DVD ROM, or other non-transitory computer readable medium which is read from and/or written to by a magnetic, optical, or other reading and/or writing system that is coupled to the processor 13, can be used for the memory 15 in the proxy server device 12.

The interface system 17 in the proxy server device 12 is used to operatively couple and communicate between the proxy server device 12, network layer security device 38, client devices 14(1)-14(n) and the server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used. In one exemplary embodiment, one or more of communication networks 18(1) and 18(2) can be a radio network, a satellite network, the Internet, a wired cable network, or combinations thereof, well known to one of ordinary skill in the art reading this disclosure.

Proxy server device 12 includes the proactive security administration module 21 which executes at least a portion of a code with at least one of the client devices for proactively securing one or more of the applications 27(1)-27(n), although this technology could be implemented in other types and numbers of devices, such as in distributed form among various components of the exemplary network environment 10. By way of example only, code that is executed by the proactive security administration module 21 can include JavaScript, Cascading Style Sheets (CSS), images, configuration files, and other application server resources and is infused with both protective code and one or more decoys or fake traps that will catch attackers' attention as disclosed herein. Proactive security administration module 21 is configured to monitor, the web traffic specifically for the triggered traps and to analyze the information sent from the client-infused protective code, although the proactive security administration module 21 can be configured to perform other functions, for example, gathering data about potential hackers, or compiling profile data associated with a detected attacker who tries to exploit a decoy placed in the infused code or server files.

In addition, proxy server device 12 includes an optional load balancer module 29 configured to split network load across multiple server devices 16(1)-16(n) based upon various policies and rules implemented, for example, by a network administrator. Although the load balancer module 29 is illustrated as a part of the proxy server device 12, it is to be noted the load balancer module 29 may alternatively be external to proxy server device 12, or be part of one or more server devices 16(1)-16(n) with one or more applications 27(1)-27(n) (e.g., web applications).

Each of the client devices 14(1)-14(n) enables a user to request, obtain, and interact with one or more applications, e.g., web applications from one or more web sites, hosted by server devices 16(1)-16(n) through the proxy server device 12 via one or more communication networks (e.g., communication network 18(1)), although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In this example, the client devices 14(1)-14(n) can include mobile devices with Internet access that permit a website form page or other retrieved data that is a part of a application to be displayed, although each of the client devices 14(1)-14(n) can connect to server devices 16(1)-16(n) via other types of network connections directly or indirectly, depending upon specific scenarios, as can be contemplated by one of ordinary skill in the art, after reading this disclosure. By way of example only, one or more of the client devices 14(1)-14(n) can comprise smart phones, personal digital assistants, computers, or other computing devices.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes one or more programs of stored instructions for one or more aspects of this technology as described and illustrated herein, although the processor could execute other numbers and types of programmed instructions.

The memory 22 in each of the client devices 14(1)-14(n) stores programmed instructions for one or more aspects of this technology as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other non-transitory computer readable medium which is read from and/or written to by a magnetic, optical, or other reading and/or writing system that is coupled to processor 20 can be used for the memory 22 in each of the client devices 14(1)-14(n).

The user input device 24 in each of the client devices 14(1)-14(n) is used to input selections, such as requests for a network resource, e.g., a particular website form page or to enter data in fields of a form page, although the user input device could be used to input other types of data and interact with other elements of exemplary environment 10. The user input device 24 can include keypads, touch screens, and/or vocal input processing systems, although other types and numbers of user input devices can be used.

The display 26 in each of the client devices 14(1)-14(n) is used to show data and information to the user, such as website page by way of example only. The display in each of the client devices 14(1)-14(n) can be a mobile phone screen display, for example, although other types and numbers of displays could be used depending on the particular type of client device, as can be contemplated by one of ordinary skill in the art, after reading this disclosure.

The interface system 28 in each of the client devices 14(1)-14(n) is used to operatively couple and communicate between the client devices 14(1)-14(n) and the proxy server device 12 and server devices 16(1)-16(n) over the communication networks 18(1) and 18(2), although other types and numbers of communication networks with other types and numbers of connections and configurations can be used.

The server devices 16(1)-16(n) can provide one or more pages from one or more web sites for use by one or more of the client devices 14(1)-14(n) via the proxy server device 12, although the server devices 16(1)-16(n) can provide other numbers and types of applications and/or content that is to be proactively secured according to the embodiments of this technology and can have or provide other numbers and types of functions. Although server devices 16(1)-16(n) are shown for ease of illustration and discussion, other numbers and types of server systems, for example, web servers, and devices can be used. In one example, server devices 16(1)-16(n) can be web servers having dedicated hardware with software executing on the dedicated hardware to facilitate the proxy server device 12 and client devices 14(1)-14(n) in their functioning. In another example, server devices 16(1)-16(n) can be content servers that are configured to deliver network resources or execute applications (e.g., applications 27(1)-27(n)) stored thereupon using the HTTP protocol or other network protocols for example. Content stored on server devices 16(1)-16(n) that can be part of the network resources requested by client devices 14(1)-14(n) can be web pages, electronic files and documents, configuration data, metadata, or other network data and files, by way of example only and not by way of limitation.

Each of the server devices 16(1)-16(n) include a central processing unit (CPU) or processor, a memory, and an interface system which are coupled together by a bus or other link, although each of the server devices 16(1)-16(n) could have other numbers and types of components, parts, devices, systems, and elements in other configurations and locations can be used. The processor in each of the server devices 16(1)-16(n) executes a program of stored instructions one or more aspects of this technology as described and illustrated by way of the embodiments herein, although the processor could execute other numbers and types of programmed instructions.

The memory in each of the server devices 16(1)-16(n) stores these programmed instructions for one or more aspects of this technology as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other non-transitory computer readable medium which is read from and/or written to by a magnetic, optical, or other reading and/or writing system that is coupled to the processor, can be used for the memory in each of the server devices 16(1)-16(n).

The interface system in each of the server devices 16(1)-16(n) is used to operatively couple and communicate between the server devices 16(1)-16(n) and the proxy server device 12 and the client devices 14(1)-14(n) via communication networks 18(1) and 18(2) through network layer security device 38, although other types and numbers of communication networks with other types and numbers of connections and configurations can be used.

Although embodiments of the proxy server device 12, the client devices 14(1)-14(n), and the server devices 16(1)-16(n), are described and illustrated herein, each of the client devices 14(1)-14(n), the proxy server device 12, and the server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems having non-transitory computer readable medium, microprocessors, digital signal processors, and micro-controllers, programmed according to the teachings of the embodiments, as described and illustrated herein, and as will be appreciated by those of ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a non-transitory computer readable medium having instructions stored thereon for one or more aspects of this technology as described and illustrated by way of the embodiments herein, which when executed by a processor, cause the processor to carry out the steps necessary to implement the methods of the embodiments, as described and illustrated herein.

Figure 2:
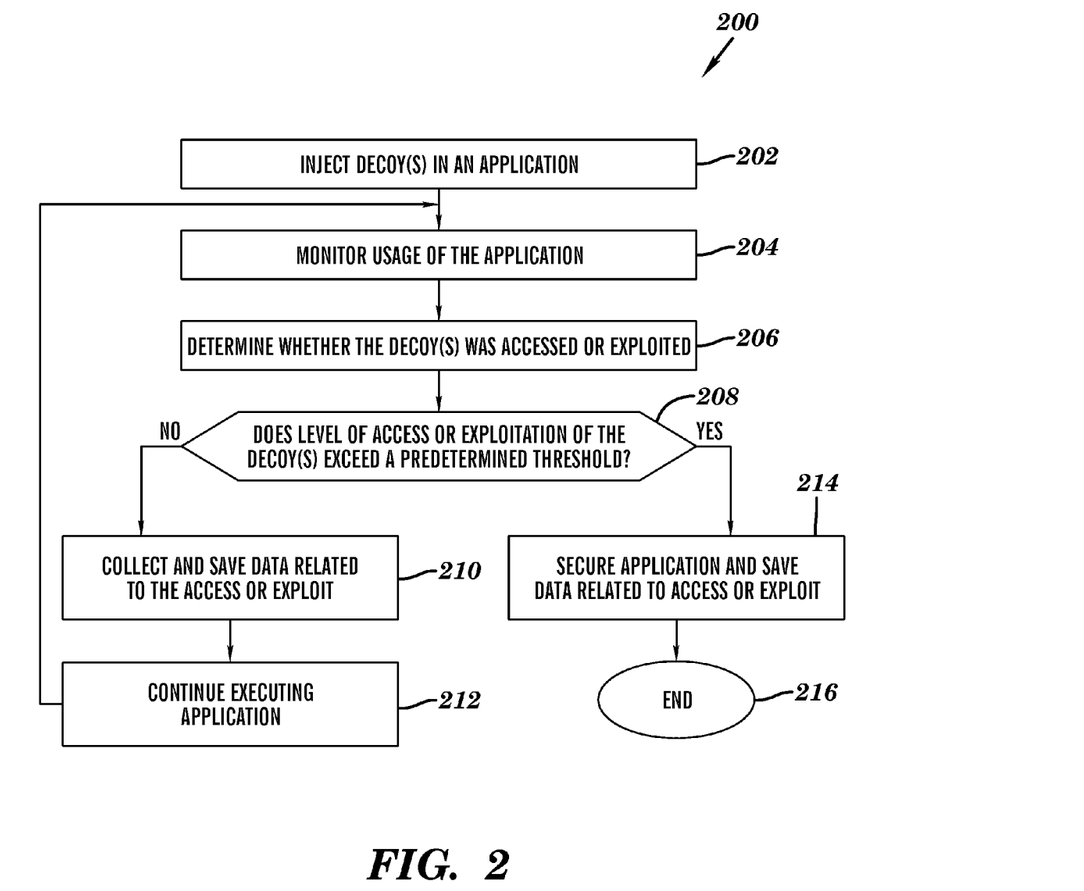
FIG. 2 is a flowchart of an example of a method for proactively securing applications.

Referring to FIG. 2, an exemplary method for proactively securing applications 27(1)-27(n) (e.g., web applications) will now be described using a flowchart 200 with reference back to FIG. 1 and reference to FIG. 3. The exemplary method disclosed herein proactively alerts an administrator of a malicious intent of an attacker and allowing them to take action prior to an actual full-scale attack. The flowchart 200 illustrates a series of exemplary steps that can be carried out to implement various exemplary embodiments of this technology, although the sequence of steps shown is by way of example only, and the order and number of steps may be modified by one of ordinary skill in the art after reading this disclosure, without departing from the scope of this technology.

In step 202, one or more decoys are injected by the proactive security administration module 21 in an executing application (e.g., application 27(1)) being used by one or more client devices 14(1)-14(n). By way of example only, often web application attacks begin with a malicious user inspecting, analyzing and reverse engineering targeted application manually or using dynamic vulnerability detection tool in an attempt to find an attack vector. By infusing the website hosting the executing web application with fake and misleading vulnerabilities, the proactive security administration module 21 drastically decreases the chance of an attacker finding and exploiting an actual problem in the website hosting the executing application, even if it exists. Examples of such decoys may be fake vulnerabilities and traps as disclosed in FIG. 3 and in the examples discussed below.

In step 204, the proactive security administration module 21 monitors usage of the executing application (e.g., a web server application) by one or more client devices 14(1)-14(n). One or more of the client devices 14(1)-14(n) may be a hostile or a malicious client device. Alternatively, one or more of the client devices 14(1)-14(n) may have malicious code installed that automatically requests or executes one or more applications 27(1)-27(n). The proactive security administration module 21 monitors such usage of the applications 27(1)-27(n) with respect to the injected one or more decoys of step 202 as well as monitoring for other aspects known to those of ordinary skill in the art, such as lack of headers and malformed content by way of example only.

Figure 5A:
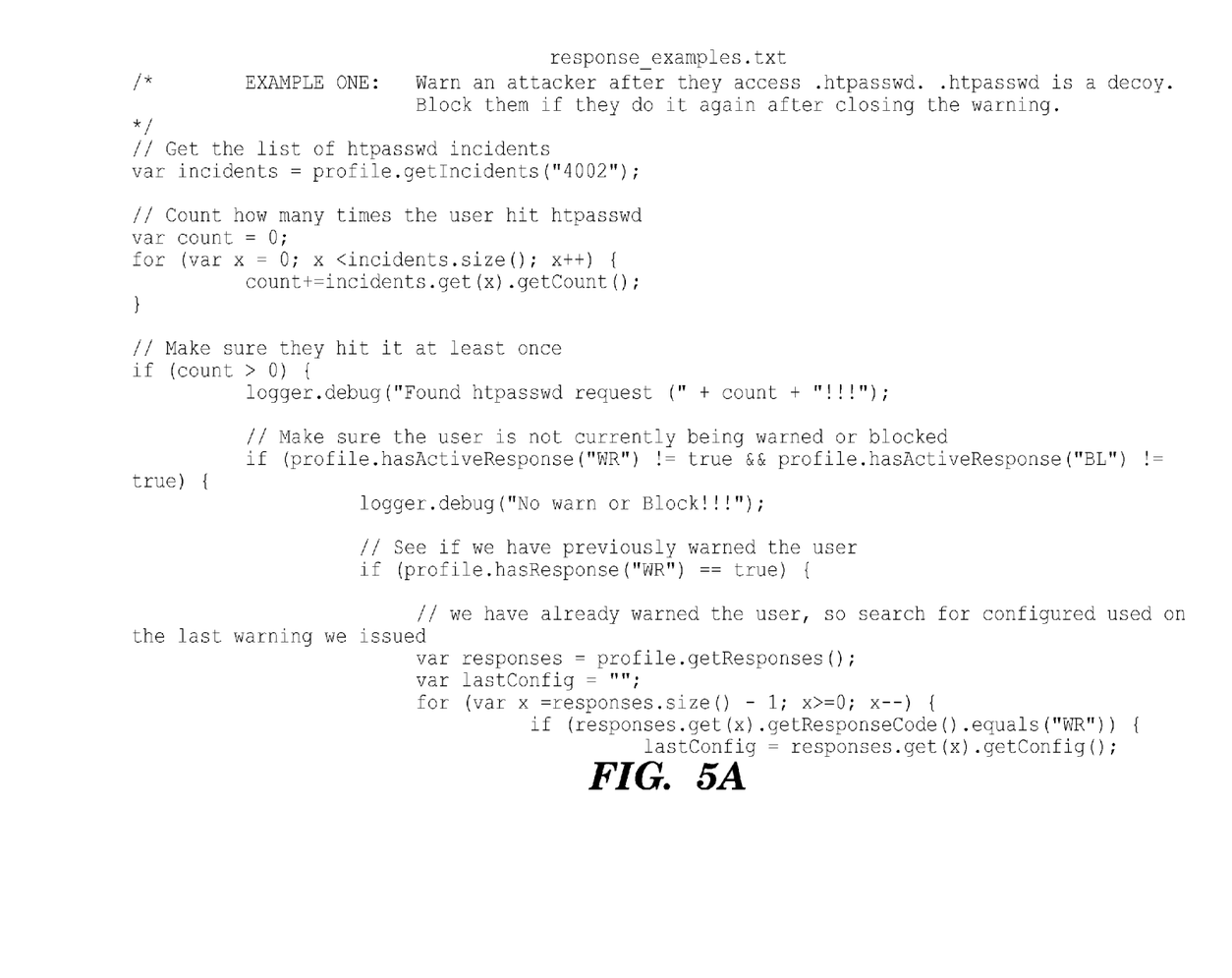
FIG. 5A and FIG. 5B illustrate two examples of programming script to assist in preventing a successful breach of the security of a web application.
Figure 5B:
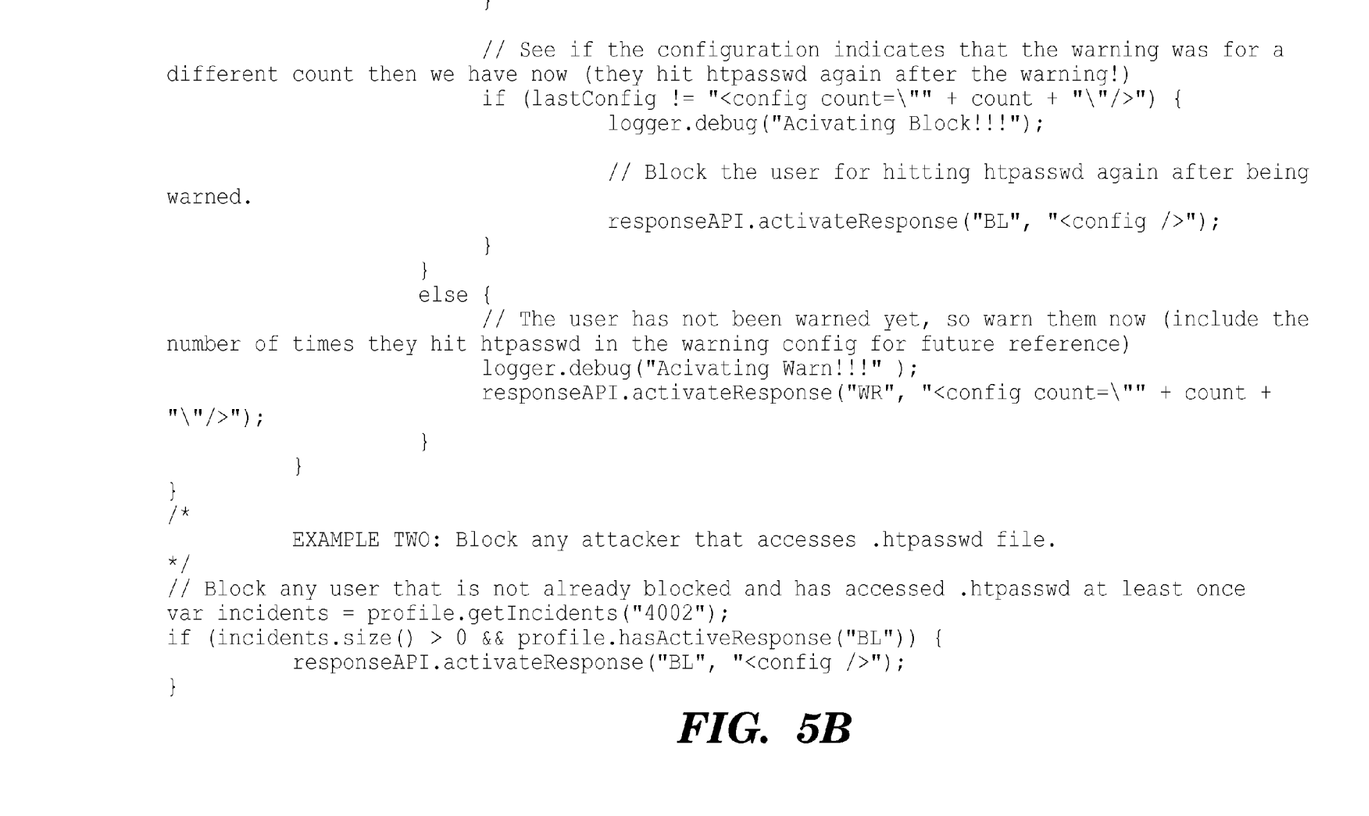

In step 206, the proactive security administration module 21 determines whether the one or more decoys injected in the code of the executing one or more applications 27(1)-27(n) was accessed at all, and if accessed whether it was exploited or not. In order to discover a decoy (e.g., a vulnerability injected in a webpage), attackers must perform several steps to explore or attempt to modify the executing application (e.g., a website) they are about to attack. By detecting those activities that otherwise would never be performed by a normal user on one or more of the client devices 14(1)-14(n), the proactive security administration module 21 can react and alert an administrator and take action prior to an attacker discovering a real vulnerability that may exist in any one or more of the applications 27(1)-27(n).

in step 208, the proactive security administration module 21 determines whether a level of exploitation of the one or more decoys exceeds a predetermined level of threshold stored, for example, in memory 15 of the proxy server device 12. The determination of the level or pattern of exploitation may be used, for example, to sift out accidental exploits by innocent users at client devices 14(1)-14(n) from intentional malicious exploits by a hostile client device among client devices 14(1)-14(n). The stored predetermined threshold can be a vector or a matrix of conditions and policies depending upon specific rules implemented by a network administrator of the exemplary network environment 10. By, way of example only, the threshold could be a minimum number of incidents or a programming script, written in a programming language such as Python or JavaScript, that determines the skill level of the hacker, as well as what appropriate counter measures should be employed to prevent a successful breach of the web application's security. Two examples of such programming script are illustrated in FIG. 5A and FIG. 5B. The determination of the level of exploitation is carried out in real-time as the accessed applications out of applications 27(1)-27(n) are executed. Alternatively, such a determination may be a passive determination occurring after the accessed applications out of applications 27(1)-27(n) have finished executing. If the level of access does not exceed the predetermined threshold, the No branch is taken to step 210. Alternatively, if the level of access and exploitation is determined to exceed the predetermined threshold level, the Yes branch is taken to step 214.

In step 210, the proactive security administration module 21 collects and saves data related to the level of access and exploit in the memory 15, for example. Such data is analyzed and the users of client devices 14(1)-14(n) are accordingly classified for their threat levels. In one exemplary embodiment, before an attacker has a chance to exploit a particular vulnerability, the proactive security administration module 21 will collect detailed information about the attacker, profile them, figure out the threat level and alert the administrators or take action by itself. As the attacker's level reaches a particular threat level threshold also configurable by the administrator and the proactive security administration module 21, the proactive security administration module 21 can take configuration based actions. These include, but are not limited to, issuing alerts to warn the administrators, warn the attacker that they have been detected, blocking their access to the site, or completely disable the site for the attacker masking it as being broken. All of the actions can be either triggered manually by the proactive security administration module 21's administrators via an administrative user interface (e.g., interface 17), or configured to be taken automatically. In addition to being alerted, the site administrator can constantly monitor system security state through the user interface (e.g., interface 17) supplied with the proactive security administration module 21, watch the system security statistics and access the historical data for reporting and analytics purposes.

In step 212, proactive security administration module 21 will continue providing execution of application based upon requests from the client devices 14(1)-14(n), and the method goes back to step 204 where the proactive security administration module 21 continues monitoring usage of the executing application.

In step 214, based upon the determined level of exploitation by an attacker, proactive security administration module 21 will secure the executing application, as discussed in detail with reference to FIG. 4. Similar to step 210, proactive security administration module 21 will collect detailed information about the attacker, profile them, figure out the threat level and alert the administrators or take action by itself. The method ends in step 216.

Figure 3:
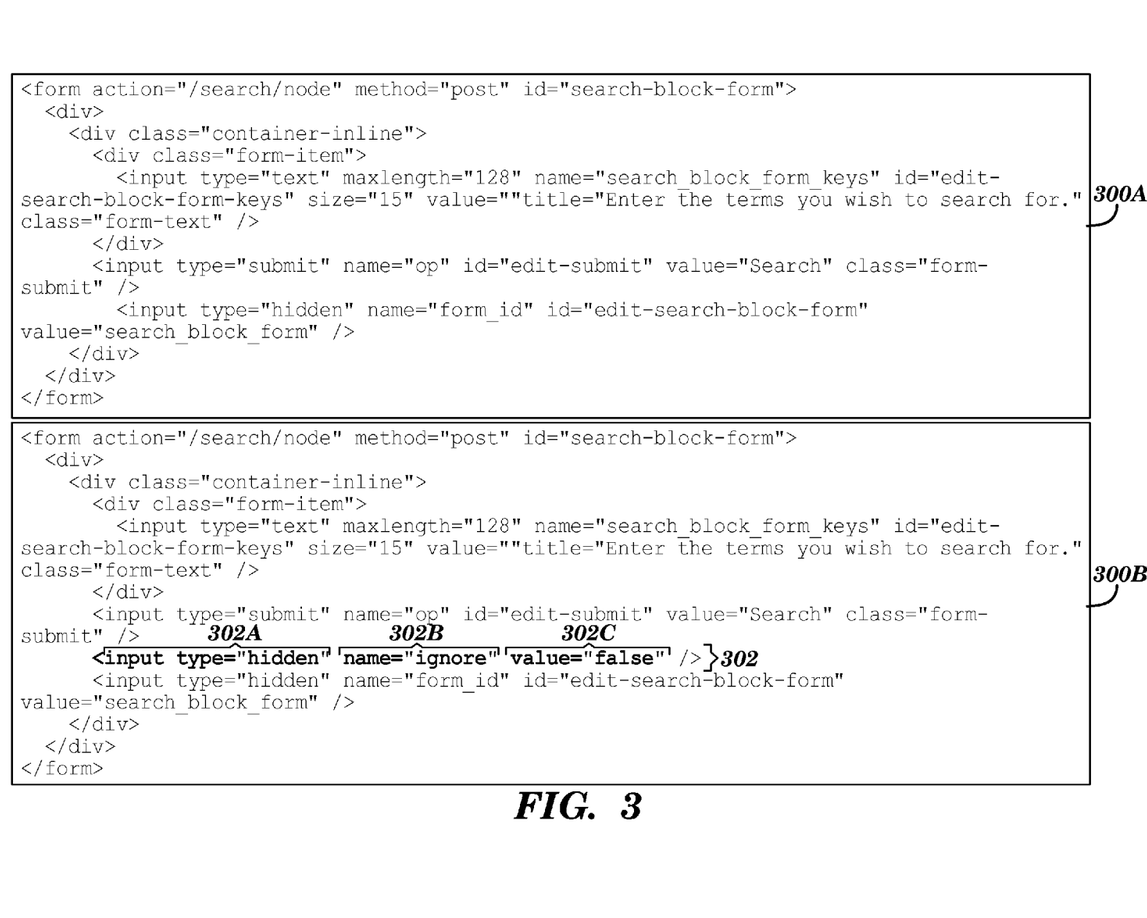
FIG. 3 illustrates an exemplary fake vulnerability injected in an exemplary code.

Referring to FIG. 3, example of a code 300A for an HTML page and a modified code 300B injected with a decoy 300 for the same HTML page are illustrated, although other types of programming language codes may be used. Further, although code 300A is being described as an example of one of the executing applications 27(1)-27(n), embodiments of this technology may be used with other types of applications, including anything at HTTP/HTTPS, as can be contemplated by those of ordinary skill in the art, after reading this disclosure. Decoy 300 is one example of a fake vulnerability or trap that is used to entice a potential attacker in order to gather data about such an attacker, as is described herein, although other types of decoy (e.g., a fake password as described below) may be used, as may be contemplated by one of ordinary skill in the art, after reading this disclosure. For example, webmasters create forms (e.g., an HTML form) which post to a common form handling service (e.g., a website) using hidden fields to indicate how the service should handle the data. A common hacking technique is to look for these hidden parameters and see if there is any way to change the behavior of the service by manipulating their values. The exemplary modified code 300B shows injected fake hidden input into forms in HTML responses and ensuring that when those values are posted back to the server devices 16(1)-16(n), they have not been modified.

In this example, the proactive security administration module 21 executes the proactive security administration module 21 in memory 15 to look for any request that generates a response with a content type of "text/html" and a status code of 200. Proactive security administration module 21 executed by the proxy server device 12 will then scan the HTML document looking for forms with a method of "HTTP POST". When a form, such as that implemented by code 300A is identified, a hidden input 302a, which is a part of decoy 302, will be injected into its body to form the modified code 300B, as shown in FIG. 3. The decision of where the input should be injected and its name and format is based on any existing hidden inputs in the form, the overall page structure and naming conventions used.

The attacker will believe that a parameter 302b corresponding to name="ignore" is a parameter read by the form handling service when code 300B is being executed, which is an exemplary type of parameter that may appear to pose a security threat to a website of which modified code 300B is a part. Since this input 302a is not actually a part of the real site implemented by code 300A and the form handler executing code 300A will not be looking for the input 302a, there is no risk posed by changing a value 302c actually altering the behavior of the form handler. Further, there is no reasonable chance that the value 302c will be modified under normal conditions by a user of the client devices 14(1)-14(n), so any modifications to the value 302c would indicate malicious activity to the proactive security administration module 21.

In yet another exemplary scenario, injection of decoy 300 (e.g., a fake vulnerability) for a basic authentication process can be used. Such an injection of decoy 300 can be an example of exposing a non-existent site resource, such as script or file. For basic authentication, proactive security administration module 21 with processor or CPU 13 is responsible for emulating a vulnerable authentication mechanism in an executing application (e.g., a web application). Proactive security administration module 21 publicly exposes fake server configuration files (e.g., ".htaccess" and ".htpasswd") that appear to be protecting a resource with basic authentication (which is a part of the HTTP protocol, for example). To the attacker, the website will appear to be exposing a sensitive administrative script on the website, with weak password protection.

The processor or CPU 13 works with proactive security administration module 21 by looking for requests to configuration files ".htaccess" and ".htpasswd" from one or more client devices 14(1)-14(n), although the configuration files may be stored elsewhere in the exemplary network environment 10 (e.g., in memory 15). When ".htaccess" is requested from a domain of the website, it will return a response containing a fake implementation of the configuration file ".htaccess." According to one example, randomization methods can be used to ensure that the particular contents of the configuration files ".htaccess" and ".htpasswd" are not repeated between customer installations. ".htpasswd" file will be purposely injected with fake user credentials and weak encryption that an experienced attacker can disable with some limited effort. As the attacker attempts to access the "protected resource such as script or file with the decrypted information, they will be identified and replied with either what looks to them like successful script execution, file, or normal server error message which is surreptitiously supplied by the proactive security administration module 21 to keep the attacker uninformed of the trap. In the mean time, the proactive security administration module 21 will identify the attacker as a high level threat because of the multiple steps of various complexity that had to be performed to access and use the configuration files ".htaccess" and ".htpasswd", and decrypt passwords, and a system alert will be issued and action can be taken based on the policies implemented for the exemplary network environment 10.

Figure 4:
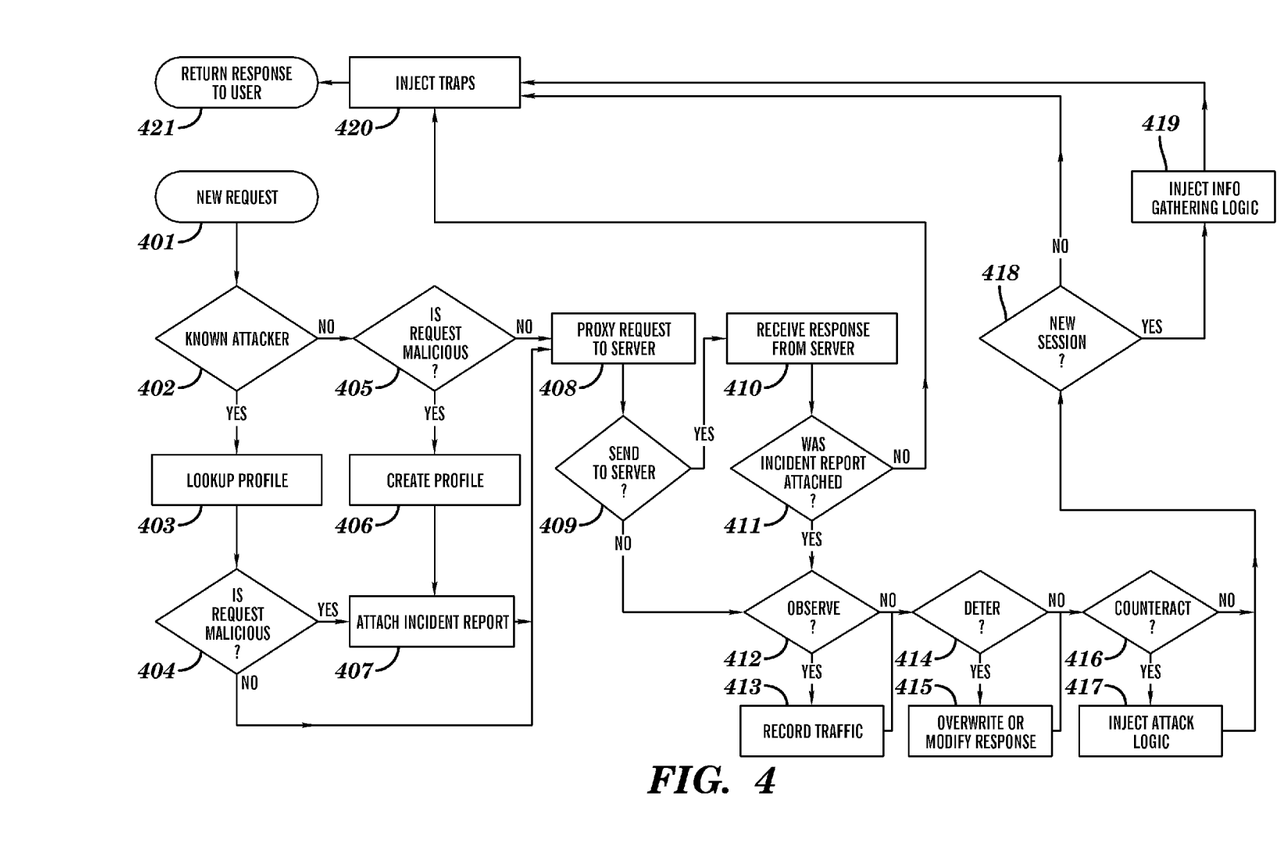
FIG. 4 is a flowchart of an example of a method for gathering information about malicious attackers based upon fake vulnerabilities and traps.

Referring to FIG. 4, an alternative embodiment of this technology is described. In this embodiment, an exemplary method for handling malicious attacks to executing applications in the exemplary network environment 10 is described using flowchart 400 with reference back to FIGS. 1-3.

In step 401, a new request from one or more of the client devices 14(1)-14(n) is received by the proxy server device 12 and analyzed by the proactive security administration module 21. An example of the request is an HTTP request for executing applications 27(1)-27(n) (e.g., a web application) residing on one or more of server devices 16(1)-16(n).

In step 402, the proxy server device 12 executes the proactive security administration module 21 to determine whether or not the end user on one of the client devices 14(1)-14(n) sending the request in step 401 is a known attacker already logged by the proactive security administration module 21. In one example, multiple re-association tactics are used by the proxy server device 12 executing the proactive security administration module 21 to identify and determine whether the user has previously been on the target site on which the application executes. If yes, then the method proceeds to step 403, and if no, the method proceeds to step 405.

In step 403, if the request is determined to be from an existing attacker, the proxy server device 12 attempts to recover the profile which was created during the previously attempted attacks the known attacker performed. This may involve, for example, looking up the profile on a network database (e.g., databases 31(1)-31(n)) shared by different applications 27(1)-27(n), although other methods of recovering the profile could be used.

In step 404, once the profile of the known attacker has been recovered by the proxy server device 12, the proxy server device 12 executing the proactive security administration module 21 checks whether or not the request is malicious based on turned on detection mechanisms, e.g., decoy 300, or other fake vulnerabilities, traps, and/or profile information recovered in step 403. If the request is determined to be not malicious, it is assumed safe and the method proceeds to step 408. Alternatively, if the request is determined to be malicious, the method proceeds to step 407.

In step 405, if the end user at one of the client devices 14(1)-14(n) is not a known attacker, the proxy server device 12 executing the proactive security administration module 21 checks for the new attacker whether or not the request is malicious based on turned on detection mechanisms, e.g., decoy 300, or other fake vulnerabilities and traps. If the request is determined to be not malicious, it is assumed safe and the method proceeds to step 408. Alternatively, if the request is determined to be malicious, the method proceeds to step 406.

In step 406, the proxy server device 12 executing the proactive security administration module 21 creates a profile for the new attacker so that future activities from this attacker can be aggregated and stored, for example, in memory 15. This may include submitting the profile to a globally maintained database (e.g., one of databases 31(1)-31(n)). The information collected includes but is not limited to the source network address (e.g., an internet protocol (IP) address), user agent environment (e.g., operating system of the attacker), physical location, intrusion tools used by the known attacker, and other profile information, as can be contemplated by one of ordinary skill in the art after reading this disclosure.

In step 407, the proxy server device 12 executing the proactive security administration module 21 collects information regarding reasons for flagging the request received in step 401 as malicious. The proxy server device 12 executing the proactive security administration module 21 then creates a record of the incident and attaches it to the attacker's profile.

In step 408, the proxy server device 12 executing the proactive security administration module 21 determines a severity or a threshold level of the incident. In step 409, the proxy server device 12 executing the proactive security administration module 21 determines whether the request that triggered an incident need to be sent to one of more server devices 16(1)-16(n) hosting the requested applications 27(1)-27(n). If the requested page or file itself was a decoy, the proactive security administration module 21 sends the response back and method proceeds to step 412. Otherwise, if the request was part of the hosted application and the incident was triggered by the code-level decoy, then the proxy server device 12 executing proactive security administration module 21 sends the request received in step 401 to an appropriate hosting one of the server devices 16(1)-16(n) for processing and method proceeds to step 410.

In step 410, the proxy server device 12 executing the proactive security administration module 21 receives one or more responses from one or more of the server devices 16(1)-16(n) based upon contents of the request. For example, a hosting one of the server devices 16(1)-16(n) may send the requested application from the applications 27(1)-27(n). Alternatively, in another exemplary scenario, one of the sever devices 16(1)-16(n) that receives the request may send an error message (e.g., "Webpage not available") in response to the request, although one of ordinary skill in the art can contemplate other types of server responses that may be received at the proactive security administration module 21 after reading this disclosure.

In step 411, the proxy server device 12 executing the proactive security administration module 21 determines whether the original request that resulted in the response from one of the server devices 16(1)-16(n) had an incident report attached to it, whether the response itself can be considered an incident, or if the identified attacker has ever created an incident in the past. If not, the No branch is taken and the method proceeds to step 420. If there was an incident report attached to the response or if identified attacker has created an incident in the past, then the Yes branch is taken to step 412.

In step 412, the proxy server device 12 executing proactive security administration module 21 performs an observation based on pre-defined configurations, to determine if the detailed information about the request/responses needs to be collected based on the attacker/hacker profile, history and incident type. If yes, the method proceeds to step 413, and if No, the method proceeds to step 414.

In step 413, if observation is enabled for currently identified attacker, the proxy server device 12 executing proactive security administration module 21 records every request response from the identified attacker/hacker. The method then proceeds to step 414.

In step 414, the proxy server device 12 executing proactive security administration module 21 performs a check to determine if the attacker needs to be deterred. If yes, the method proceeds to step 415, and if not, the method proceeds to step 416.

In step 415, if deterrence is enabled, the proxy server device 12 executing proactive security administration module 21 injects respective logic into responses or alters the handling of traffic for the identified attacker. By way of example only, this logic basically is a modification of the response, e.g. slowing down the site, making it non-functional, placing a warning on the response page, and/or an arbitrary configured file could be returned for all future requests issued by the attacker, including images, HTML files, binary files, or any other digital representation of data. The method then proceeds to step 416.

In step 416, the proxy server device 12 executing proactive security administration module 21 checks to determine if the proxy server device 12 is configured to counteract the currently identified attacker. Alternatively, proactive security administration module 21 when part of an application executing on one of the client devices 14(1)-14(n) or executing one of the server devices 16(1)-16(n) can perform the check to determine if the proxy server device 12 is configured to counteract the currently identified attacker. If yes, the method proceeds to step 417, and if not, the method proceeds to step 418.

In step 417, if the proxy server device 12 executing the proactive security administration module 21 is enabled to counteract the currently identified hacker, the proxy server device 12 executing the proactive security administration module 21 injects the respective logic for the desired counter attack measure. By way of example only, the logic for the counter measure could be to completely block the identified hacker from site access or to send executable code that will explore the attacker's environment and/or disable the attack tools/software, although other types of logic for a counter attack measure could be used. The method then proceeds to step 418.

In step 418, the proxy server device 12 executing proactive security administration module 21 determines whether this is the first time the currently identified attacker has been encountered in a window of time and has started a new session with one or more of the server devices 16(1)-16(n). If it is the first time, the Yes branch is followed to step 419. If not, the No branch is followed to step 420.

In step 419, when the proxy server device 12 executing proactive security administration module 21 determines in step 418 that the attacker has started a new session, proactive security administration module 21 injects logic into the response that can be used to collect additional details about the attacker's environment (e.g., an operating system information) and other information related to the attacker's profile.

In step 420, in order to support some of the detection mechanisms as discussed above, the response from the application servers (e.g., one or more of server devices 16(1)-16(n)) can be modified to include additional decoys similar to decoy 300.

In step 421, the proxy server device 12 executing proactive security administrator module 21 returns the modified response to the end user as if the request had been made directly to the application server in the server devices 16(1)-16(n). In this embodiment, the end user does not know the process of flowchart 400 was performed in the background while the original request in step 401 is being processed. Accordingly, the attacker is unaware of the actions performed by the proxy server device 12 executing proactive security administrator module 21 in proactively securing applications 27(1)-27(n), and launching counter attack measures, as discussed above.

It is to be noted the order of steps 401-421 shown in flowchart 400 is exemplary and one of ordinary skill in the art can contemplate equivalent alternative steps in alternative orders to achieve the same results performed by carrying out steps 401-420 of flowchart 400 in FIG. 4. Further, steps 401-421 can be used in addition to other steps, for example, steps 202-216 of flowchart 200 in FIG. 2, which steps 202-216 are also exemplary and are not restricted by the order shown in FIG. 2. Furthermore, one of ordinary skill in the art, after reading this disclosure, can contemplate combining two or more of steps 401-421 and/or 202-216 shown in flowcharts 200 and 400, respectively, and this technology is not limited by the order or the number of steps shown in FIGS. 2 and 4.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for proactively securing a web application, the method comprising:
    receiving, from a client device and by a proactive administrative proxy server positioned between the client device and a server device, a request to access a web application provided by the server device;
    sending the request from the proactive administrative proxy server to the server device;
    receiving, with the proactive administrative proxy server, a response from the server device, wherein the response includes the requested web application;
    after receiving the response, injecting, with the proactive administrative proxy server positioned between the client device and the server device, one or more decoys into the web application contained within the response to form a modified response;
    sending the modified response from the proactive administrative server to the client device;
    identifying, with the proactive administrative proxy server, an attempt by the client device to exploit one of the one or more injected decoys in the web application; and
    performing with the proactive administrative proxy server at least one action to secure the web application from the attempted exploitation.

2. The method as set forth in claim 1 wherein the injecting further comprises injecting with the proactive administrative proxy server the one or more decoys in real-time into the web application contained within the response after receiving the response from the server device and prior to sending the modified response to the client device.

3. The method as set forth in claim 1 wherein the one or more decoys further comprises at least one of a fake vulnerability and a trap.

4. The method as set forth in claim 1 further comprising actively monitoring, with the proactive administrative proxy server, subsequent requests from the client device to determine whether the subsequent requests from the client device attempt to utilize the one or more decoys that were injected in the web application by the proactive administrative proxy server, wherein the identifying is based on the monitoring.

5. The method as set forth in claim 4 further comprising:
    collecting information with the proactive administrative proxy server about the attempted exploitation based on the monitoring; and
    categorizing and classifying with the proactive administrative proxy server the attempted exploitation to obtain a threat level, wherein the performing further comprises selecting the action to secure the executing application based on the threat level.

6. The method as set forth in claim 1 wherein the at least one action comprises blocking with the proactive administrative proxy server the attempted exploitation.

7. The method as set forth in claim 1 wherein the at least one action comprises issuing an alert with the proactive administrative proxy server about the attempted exploitation.

8. A non-transitory computer readable medium having stored thereon instructions for proactively securing a web application comprising machine executable code which when executed by at least one processor, causes the processor to perform steps comprising:
    receiving, from a client device and by a proactive administrative proxy server positioned between the client device and a server device, a request to access a web application provide by the server device;
    sending the request from the proactive administrative proxy server to the server device;
    receiving, with the proactive administrative proxy server, a response from the server device, wherein the response includes the requested web application;
    after receiving the response, injecting, with the proactive administrative proxy server positioned between the client device and the server device, one or more decoys into the web application contained within the response to form a modified response;
    sending the modified response from the proactive administrative server to the client device;
    identifying, with the proactive administrative proxy server, an attempt by the client device to exploit one of the one or more injected decoys in the web application; and
    performing with the proactive administrative proxy server at least one action to secure the web application from the attempted exploitation.

9. The non-transitory medium as set forth in claim 8 wherein the injecting further comprises injecting the one or more decoys in real-time into the web application contained within the response after receiving the response from the server device and prior to sending the modified response to the client device.

10. The non-transitory medium as set forth in claim 9 wherein the one or more decoys further comprises at least one of a fake vulnerability and a trap.

11. The non-transitory medium as set forth in claim 8 further comprising actively monitoring, with the proactive administrative proxy server, subsequent requests from the client device to determine whether the subsequent requests from the client device attempt to utilize the one or more decoys that were injected in the web application by the proactive administrative proxy server, wherein the identifying is based on the monitoring.

12. The non-transitory medium as set forth in claim 11 further comprising:
    collecting information about the attempted exploitation based on the monitoring; and
    categorizing and classifying the attempted exploitation to obtain a threat level, wherein the performing further comprises selecting the action to secure the executing application based on the threat level.

13. The non-transitory medium as set forth in claim 8 wherein the at least one action comprises blocking the attempted exploitation.

14. The non-transitory medium as set forth in claim 8 wherein the at least one action comprises issuing an alert about the attempted exploitation.

15. A proactively secured computing apparatus comprising:
   one or more processors;
   a memory coupled to the one or more processors which are configured to execute programmed instructions stored in the memory, the instructions comprising executable code for:
      receiving, from a client device and by a proactive administrative proxy server positioned between the client device and a server device, a request to access a web application provide by the server device;
      sending the request from the proactive administrative proxy server to the server device;
      receiving, with the proactive administrative proxy server, a response from the server device, wherein the response includes the requested web application;
      after receiving the response, injecting, with the proactive administrative proxy server positioned between the client device and the server device, one or more decoys into the web application contained within the response to form a modified response;
      sending the modified response from the proactive administrative server to the client device;
      identifying, with the proactive administrative proxy server, an attempt by the client device to exploit one of the one or more injected decoys in the web application; and
      performing with the proactive administrative proxy server at least one action to secure the web application from the attempted exploitation.

16. The apparatus as set forth in claim 15 wherein the one or more processors is further configured to execute programmed instructions stored in the memory for injecting further comprising injecting the one or more decoys in real-time into the web application contained within the response after receiving the response from the server device and prior to sending the modified response to the client device.

17. The apparatus as set forth in claim 16 wherein the one or more decoys further comprises at least one of a fake vulnerability and a trap.

18. The apparatus as set forth in claim 15 wherein the one or more processors is further configured to execute programmed instructions stored in the memory further comprising actively monitoring, with the proactive administrative proxy server, subsequent requests from the client device to determine whether the subsequent requests from the client device attempt to utilize the one or more decoys that were injected in the web application by the proactive administrative proxy server, wherein the identifying is based on the monitoring.

19. The apparatus as set forth in claim 18 wherein the one or more processors is further configured to execute programmed instructions stored in the memory further comprising:
   collecting information about the attempted exploitation based on the monitoring; and
   categorizing and classifying the attempted exploitation to obtain a threat level, wherein the performing further comprises selecting the action to secure the executing application based on the threat level.

20. The apparatus as set forth in claim 15 wherein the at least one action comprises blocking the attempted exploitation.

21. The apparatus as set forth in claim 15 wherein the at least one action comprises issuing an alert about the attempted exploitation.

* * * * *